United States Patent [19]
Chen

[11] Patent Number: 5,422,154
[45] Date of Patent: Jun. 6, 1995

[54] MULTI-COLOR FLOOR COVERING BY INJECTION AND PUNCH-PRESSING PROCESSES WITH THERMOPLASTIC ELASTOMER BASE

[76] Inventor: Hui-Mei Chen, No. 49, Lane 199, San Jiun St., Shu Lin Chen, Taipei Hsien, Taiwan, Prov. of China

[21] Appl. No.: 992,604

[22] Filed: Dec. 18, 1992

[51] Int. Cl.⁶ .............................................. B32B 9/00
[52] U.S. Cl. ........................................ 428/92; 428/57; 428/76; 428/85; 428/95; 428/207; 428/290; 428/908.8; 156/72; 156/307.3
[58] Field of Search ............. 428/195, 95, 206, 207, 428/92, 290, 76, 908.8, 85, 57; 156/72, 307.3

[56] References Cited

U.S. PATENT DOCUMENTS

| | | | |
|---|---|---|---|
| 4,201,812 | 5/1980 | Blanken et al. | 428/95 |
| 4,342,802 | 7/1982 | Pickens, Jr. et al. | 428/92 |
| 4,461,794 | 6/1984 | Bischoff et al. | 428/57 |
| 4,579,764 | 4/1986 | Peoples, Jr. et al. | 428/95 |
| 5,024,869 | 6/1991 | Yeh et al. | 428/97 |
| 5,188,876 | 2/1993 | Hensel et al. | 428/76 |

Primary Examiner—Patrick J. Ryan
Assistant Examiner—Abraham Bahta
Attorney, Agent, or Firm—Dvorak and Traub

[57] ABSTRACT

A floor covering with at least two colors using thermoplastics elastomers as its base material wherein the first base material is formed and set in the first work station of a multistation rotary injection molding machine having a turntable to transfer the first finished material to the second work station for punching, then to the third work station where a second base material with different color is melted and filled up the holes and bottom parts of the first finished material, at last the copolymers with at least two colors is being unloaded, calendered and extruded to form a flat and flexible floor covering.

6 Claims, 4 Drawing Sheets

MULTI-COLOR FLOOR COVERING BY INJECTION AND PUNCH-PRESSING PROCESSES WITH THERMOPLASTIC ELASTOMER BASE

BACKGROUND OF THE INVENTION

1. Field of the Invention

The present invention is related to a floor covering, particularly a color-coated laminated floor covering with thermoplastic elastomers as its base material.

2. Description of the Prior Art

The base materials used in the conventional floor covering may be classified into several types: ceramic, natural wood and polyvinyl chloride (PVC). The PVC type floor covering has the distinctive features of being able to be manufactured quickly and is light weight, it is therefore lower in manufacturing cost and sales prices as well as installation costs are lower than ceramic and other natural wood coverings, for these reasons it is more acceptable by the majorities in our society. But the PVC floor covering is not fire retardant, and is easy to wear out after a period of time; PVC materials also emit chlorine which is poisonous during burning, it is dangerous and creates a certain degree of threat in case of fire accidental. In addition, it is not easy to comply with regulations for the environmental protection in disposition of PVC. Based on the above disadvantages, the general public and the environmental protection agency are lowering their acceptance to PVC floor covering. To overcome these drawbacks, their PVC floor covering manufacturers have recently developed a thermoplastic elastomers floor covering using vinyl and ethylene-vinyl acetate copolymers (EVA) as its base materials; but experiments show that the surface of EVA floor covering is easy to wear out and tear, at the same time, it is hard to use existing equipments to process and manufacture EVA floor covering, driving the manufacturing cost to be higher, this as well as its poor mechanical surface property lead to the fact that EVA floor covering is not an ideal one to choose.

Natural vulcanized rubber has an excellent mechanical surface property and is suitable for use as a base material for floor covering, but the vulcanization and thermal process for natural rubber is relatively slow, its manufacturing cost therefore can not be lowered and hence natural rubber floor covering is not competitive in the market. The natural rubber can not be reprocessed after the vulcanization. This not only creates an environmental problem but also increases its manufacturing cost due to the non-recovery loss in rejected products and materials.

SUMMARY OF THE INVENTION

Thus, there is a need replacement for PVC or EVA floor coverings, a low cost, light weight and long lasting material is highly demanded by the general consumers and the floor covering manufacturers.

The object of this invention is to provide a color-coated floor covering with thermoplastic elastomers as its base material, said floor covering has the unique characteristic of vulcanized rubber as well as the distinctive feature of thermoplastics; not only that it has an excellent mechanical surface for wear and tear, but also it can be made into a flat and flexible floor covering with the existing plastic manufacturing equipments and technology.

The floor covering according to the present invention uses thermoplastic elastomers as its base material, it has a very good elastic recovery capability, and it is therefore quite different from the conventional PVC or EVA types that are not flexible, said floor covering has other properties similar to the natural vulcanized rubber such as the high friction coefficient of thermoplastic elastomers. Generally speaking, at a definite hardness condition, the friction-resistant coefficient for the floor covering according to the present invention is higher than that of the conventional PVC floor covering by approximately 30 to 50%; laboratory experiments also show that the floor covering possess other resistant properties to piercing, tearing, cracking and aging as well as repellent to ozone, ultraviolet, grease, water, dilute sulfuric acid, base and other solutions. Besides, the floor covering with thermoplastic elastomers according to the present invention is also resistant to burning, not only that it is more suitable in application than conventional PVC type, but also it is a good quality fire-proof building material.

The color-coated floor covering with thermoplastic elastomers has a better feature than the natural vulcanized rubber in its economical manufacturing process and ease of handling. The present invention can be formed and processed by the existing process, and the cycle time in setting the thermoplastic elastomers is shorter than the cycle time to compress and form the conventional rubber. Hence, the present invention can effectively manufacturing cost, and make the product more competitive in the market; at the same time, the thermoplastic elastomers of the present invention has an excellent thermal stability under normal processing, the disposed materials can be reprocessed a few times, but its physical and chemical characteristics do not degrade, or only degrade a little bit. The highest process temperature of the floor covering according to the present invention is between 210 to 260| C. and its highest operating temperature is between 65 to 150| C. It is still flexible at minus 85| C. The melting/solidification cycles of thermoplastic elastomers can be repeated many times, therefore the disposed materials can be reprocessed and the manufacturing cost is lower.

A distinctive feature of the present invention is the use of multistation rotary machine to fabricate color-coated laminated floor covering with at least 2 colors, in which the first base material is being injected and set in the mold of the first work station, the rotational table rotates to the second work station for piercing, then rotates to the third work station wherein a second base material with colorants is being added to it, the second base material with colorants melts and fills the punch holes and the bottom part of the first base material; at last the polymer with 2 different colors is pulled out, calendered and extruded into a flat and flexible floor covering. In general plastic product surfaces are printed with different colors for artistic and decoration purposes, but surfaces with hot roll printing, painting and electro-plating are not good for repeated friction and such printing is therefore not suitable to be used as printing method for floor covering with heavily walking traffic.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
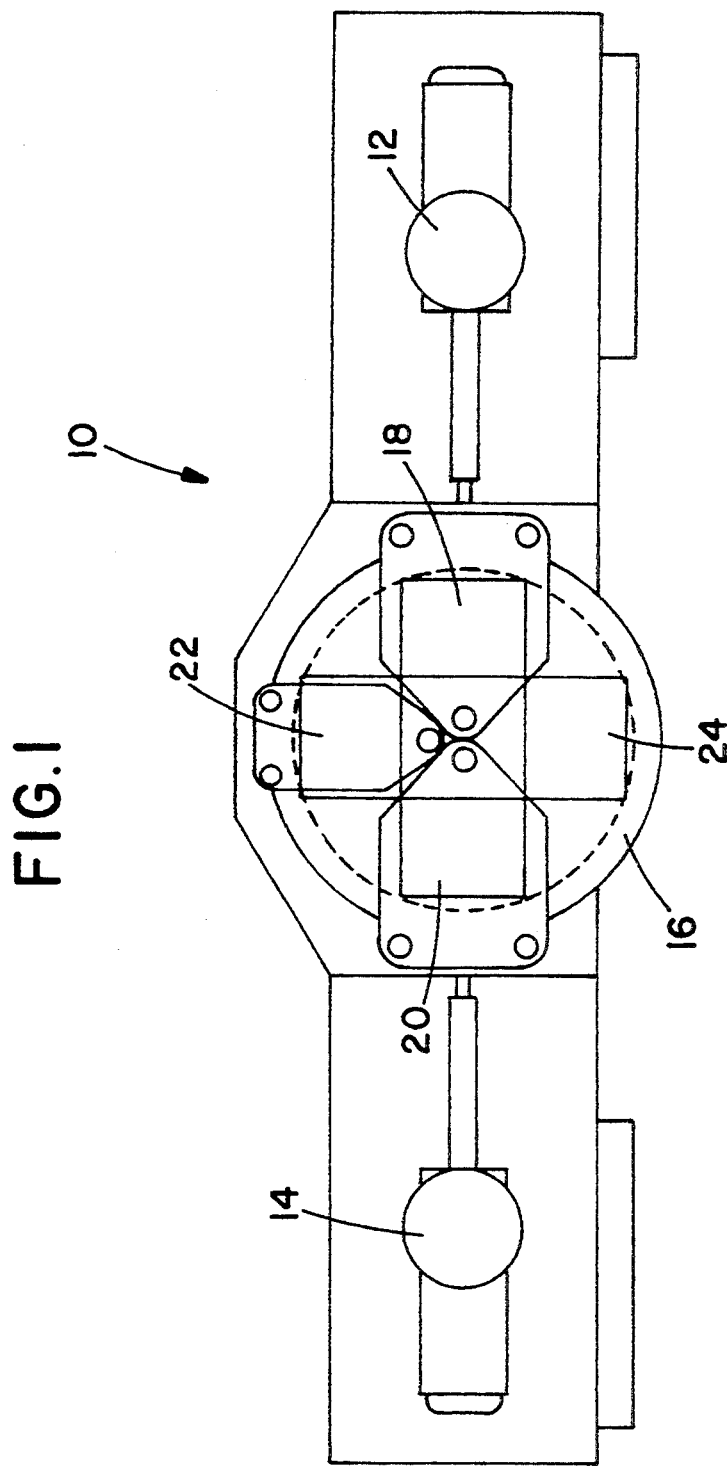
FIG. 1 is a perspective view of a multistation rotary injection molding machine for fabrication of the color-coated laminated floor covering according to the present invention.
Figure 2:
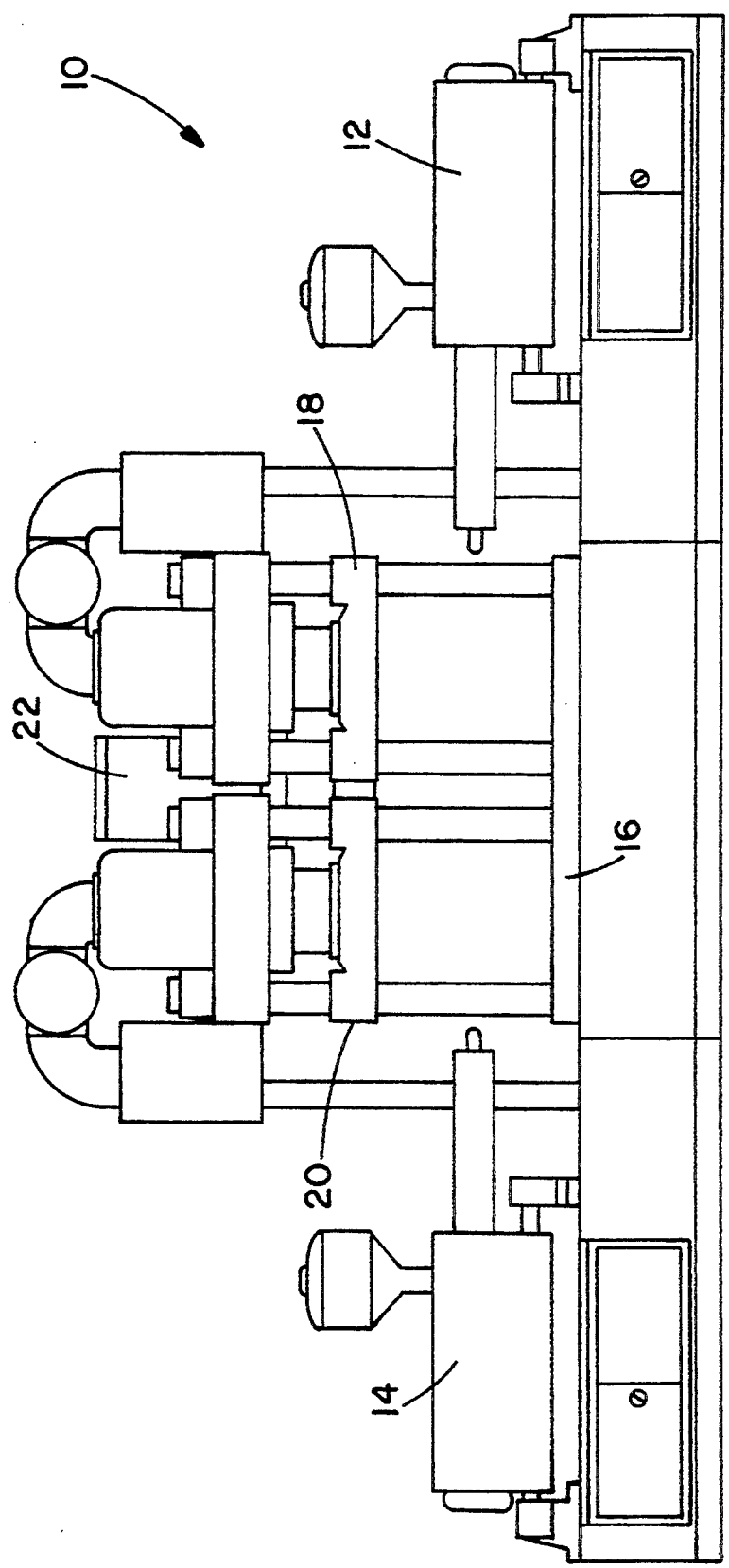
FIG. 2 is a front view of the rotary injection molding machine according to the present invention.

Please refer to the attached drawings for illustrations. The injection molding machine 10 for the manufacturing of the color-coated laminated floor covering according to the present invention mainly comprises of a corresponding pair of first and second injection molding machines 12 and 14 as well as a turntable 16 in between. The turntable 16 comprises 4 work stations, wherein work stations 1 and 3 includes injection molds 18 and 20 for setting of base materials 1 and 2 respectively, the second work station includes a puncher 22 and the fourth work station is the unloading device 24 for finished materials. The first base material in the form of powder or pellet is melted in the first injection molding machine 12 to convert into a sticky form, then it is being injected into the injection mold 18 until it changes into a solid state to become a flat and thin first finished material. The said finished material is being rotated from first work station to second work station by the turntable 16, the puncher 22 then punches a few holes with patterns on first finished materials (From Fig.3 it is obvious to see the holes in first finished material 32) After punching, the first finished material 32 is being rotated into the injection mold 20 of the third work station by turntable 16, a second base material with colorant is being added into the injection mold 20, mixing and filling the holes and the bottom parts of first finished material 32, at last the flat and flexible floor covering 40 with at least two colors (as shown in FIG. 4) is being unloaded by unloading device 24, the process to fabricate the color-coated laminated floor covering is hence completed.

Figure 3:
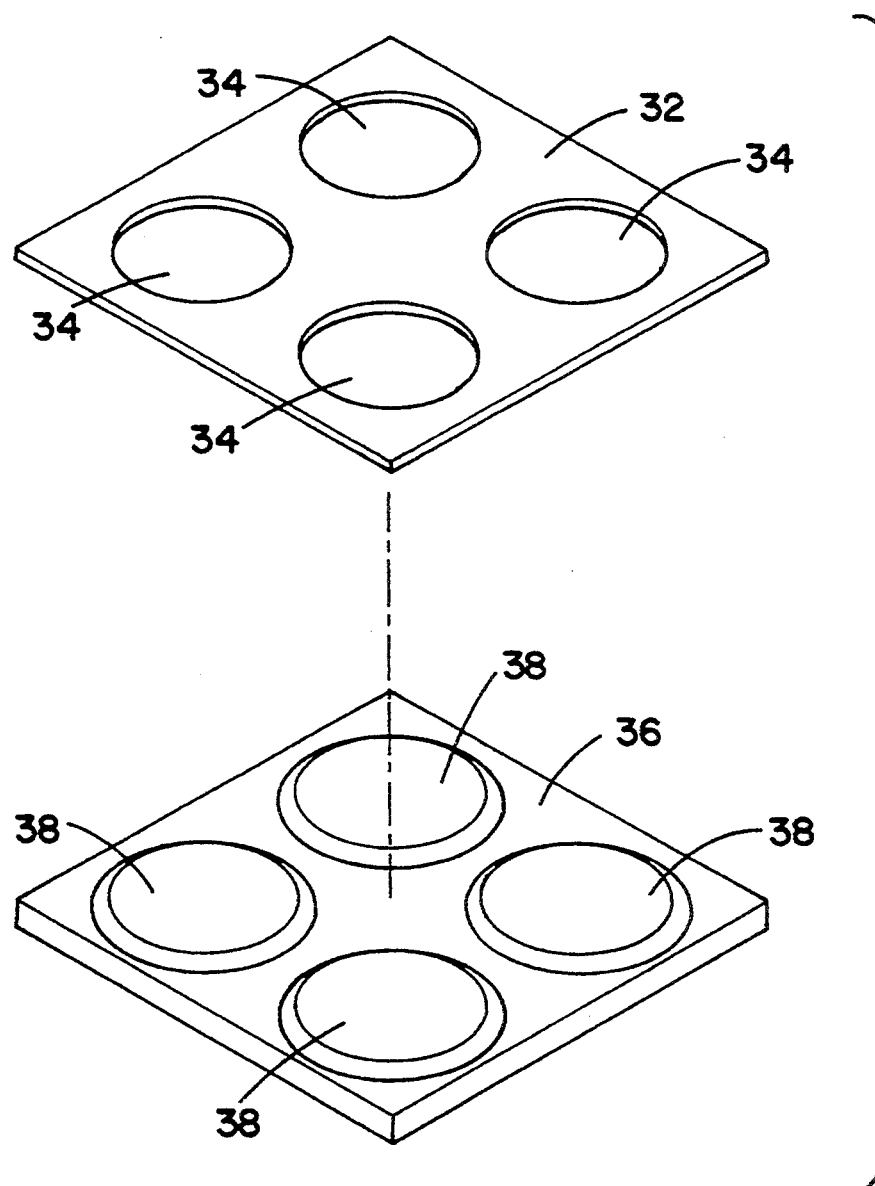
FIG. 3 is a 3-dimensional fragmented view of the first and second finished materials according to the present invention.
Figure 4:
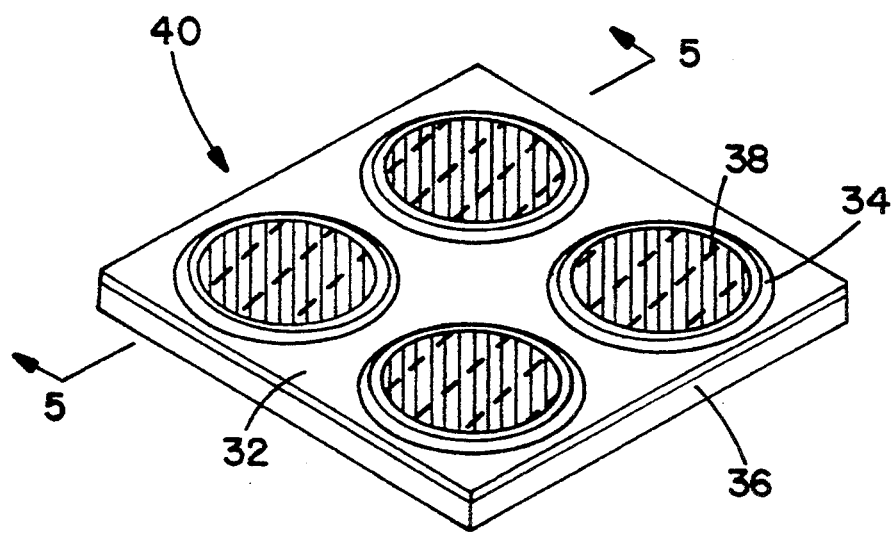
FIG. 4 is a assembly drawing of FIG. 3 according to the present invention.
Figure 5:
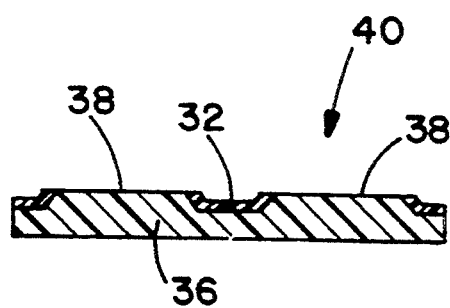
FIG. 5 is a partial fragmented view of the color-coated laminated floor covering according to the present invention as taken along line 5—5 in FIG. 4.

Please refer to FIG. 3 through FIG. 5, showing first finished material 32 and second finished material 36 fabricated from thermoplastic elastomers and colorants, practically the melting is done by copolymerization wherein second finished material 36 consists of a few raised portions 38 that can be fitted into the holes 34 of first finished material 32, the raised portions are formed from the shape of injection mold 20 and its height may be equal to, higher or lower than the thickness of the first finished material 32.

Plastics manufacturers usually use injection mold with raised poles to fabricate plastic products, the injection machine injects a sticky plastic material into the mold and fills it. After the plastic material became solid, a finished plastic product with holes is formed. However this process is costly and time consuming. In addition, the sticky plastic raw material in contact with the raised portions of the mold creates a rough finish around the holes of the finished products, affecting the surface's mechanical property and therefore the finished product is not an ideal material for floor covering.

The first and second base materials used in the color-coated laminated floor covering according to this invention is made up of approximately 40–75% of base copolymers, 20–35% of strengthened copolymers and 15–40% of flexible copolymers. The base copolymers are selected from styrene and butadiene as thermoplastic elastomers, particularly using Styrene-Butadiene-Styrene (SBS) as copolymers; the strengthened polymers are selected from crystallized polystyrene, high impact polystyrene and/or poly-a-methystyrene which are soluble in the base materials; the flexible polymers are selected from mixture of the base polymer and strengthened polymer, such as ethylene-vinyl acetate polymers (EVA). An appropriate amount flame retardant, such as aluminum oxide solution may be added to the base material. Ultraviolet stabilizer, antioident, and other additives may be added to the base materials of the present invention. The above additives increase the fire retardant property, and prolong the service life of the mechanical properties of the floor covering. To promote the overall appearance of the floor covering, different colorants are added to the first and second base materials so as to create a smooth and evenly colored surface of the finished products.

As compared to the conventional floor coverings, the color-coated laminated floor covering according to the present invention is cheaper, light weight and easy to fabricate; as compared to conventional PVC or EVA types, the floor covering according to the present invention has the distinctive features of sulfurous rubber as well as the quick processing of thermoplastics, not only that it has an excellent mechanical surface, it can be fabricated with the existing plastic equipments and technologies. Hence the floor covering according to the present invention has the advantages of the conventional PVC or EVA floor coverings but does not have their disadvantages. Additionally, the floor covering according to the present invention has the following advantages that can not be found in the conventional floor coverings:

(1) Elimination of the sulfurous reaction to cut the cost of solidification, processing and fabrication;
(2) Reuse of disposed materials can effectively bring down the cost of manufacturing and indirectly lower the environmental impacts of plastic materials;
(3) At normal temperature, the floor covering according to the present invention has a higher tensile strength;
(4) The floor covering according to the present invention is more flexible than natural rubber at low temperature;
(5) The floor covering according to the present invention has a higher coefficient of friction and therefore lasts longer;
(6) The floor covering according to the present invention can be made in any color and
(7) The hardness of the floor covering is selectable, besides being able to be used as a good floor covering, it may also be used as a surface covering at home, commercially and industrially.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A multi-color floor covering comprising:
   a first layer having an upper surface, a lower surface, and a hole extending therethrough; and
   a second layer having a lower surface, and an upper surface with a raised portion extending therefrom, the lower surface of the first layer being fused with the upper surface of the second layer, the raised portion of the second layer is aligned with and extends into the hole in the first layer, wherein the first and second layers form the multi-color floor covering.

2. The multi-color floor covering of claim 1, wherein the first and second layers are formed of a base material having approximately 40 to 74 percent of a base copolymer, approximately 20 to 35 percent of a strengthened copolymer, and approximately 15 to 40 percent of a flexible copolymer.

3. The multi-color floor covering of claim 2, further comprising a flame retardant.

4. The multi-color floor covering of claim 1, wherein the flame retardant is selected from the group comprising an aluminum oxide solution, an ultraviolet stabilizer, and an antioxidant.

5. The multi-color floor covering of claim 1, the raised portion of the second layer having a substantially flat upper surface that is substantially level with the upper surface of the first layer, wherein the upper surface of the first layer and the upper surface of the raised portion form an out outer surface of the multi-color floor covering.

6. The multi-color floor covering of claim 1, the wherein the first layer is a different color than the second layer.

* * * * *